United States Patent
Doan et al.

(10) Patent No.: US 7,459,402 B2
(45) Date of Patent: Dec. 2, 2008

(54) PROTECTION LAYERS IN MICROMIRROR ARRAY DEVICES

(75) Inventors: Jonathan Doan, Mountain View, CA (US); Satyadev Patel, Palo Alto, CA (US); Peter Heureux, Felton, CA (US)

(73) Assignee: Texas Instruments Incorporated, Dallas, TX (US)

( * ) Notice: Subject to any disclaimer, the term of this patent is extended or adjusted under 35 U.S.C. 154(b) by 247 days.

(21) Appl. No.: 11/135,699

(22) Filed: May 24, 2005

(65) Prior Publication Data

US 2005/0206993 A1 Sep. 22, 2005

Related U.S. Application Data

(63) Continuation-in-part of application No. 10/365,951, filed on Feb. 12, 2003, now Pat. No. 6,952,302.

(51) Int. Cl.
*H01L 21/302* (2006.01)

(52) U.S. Cl. .................... 438/723; 438/700

(58) Field of Classification Search ........... 438/700, 438/706, 712, 719, 720, 723, 724, 725

See application file for complete search history.

(56) References Cited

U.S. PATENT DOCUMENTS

| 5,504,614 | A | * | 4/1996 | Webb et al. ............ 359/223 |
|---|---|---|---|---|
| 5,552,924 | A | | 9/1996 | Tregilgas |
| 5,567,334 | A | | 10/1996 | Baker et al. |
| 5,604,625 | A | | 2/1997 | Henck |
| 5,652,671 | A | | 7/1997 | Knipe et al. |
| 5,942,054 | A | | 8/1999 | Tregilgas et al. |
| 5,996,619 | A | | 12/1999 | Saur et al. |
| 2001/0040675 | A1 | * | 11/2001 | True et al. ............ 355/77 |
| 2002/0196524 | A1 | * | 12/2002 | Hulbers et al. ......... 359/291 |
| 2005/0073735 | A1 | * | 4/2005 | Monroe et al. ......... 359/290 |
| 2005/0106772 | A1 | * | 5/2005 | Monroe et al. ......... 438/48 |
| 2006/0024620 | A1 | * | 2/2006 | Nikkel et al. .......... 430/321 |

* cited by examiner

*Primary Examiner*—Kin-Chan Chen
(74) *Attorney, Agent, or Firm*—Wade J. Brady, III; Frederick J. Telecky, Jr.

(57) ABSTRACT

To protect the structural layers from being eroded in the etching process, a protection layer is deposited on the exposed structural layers of the micromirror. The protection layer is deposited before etching and removed after etching.

26 Claims, 6 Drawing Sheets

PROTECTION LAYERS IN MICROMIRROR ARRAY DEVICES

CROSS-REFERENCE TO RELATED APPLICATIONS

This patent application is a continuation-in-part of U.S. patent application Ser. No. 10/365,951 filed Feb. 12, 2003 now U.S. Pat. No. 6,952,302, the subject matter being incorporated herein by reference in entirety.

TECHNICAL FIELD OF THE INVENTION

The present invention is related generally to spatial light modulators, and, more particularly, to spatial light modulators with novel hinge structures and methods for making the same.

BACKGROUND OF THE INVENTION

Spatial Light Modulators (SLMs) are transducers that modulate an incident beam of light in a spatial pattern that corresponds to an optical or electrical input. A type of SLM is the SLM based on Micro Electro-Mechanical Systems (MEMS). A typical MEMS-based SLM consists of an array of micromirrors mounted on movable elements. Each individual micromirror can be independently deflected by an electrostatic force. Reflection of a beam of incident light impinging a micromirror can then be controlled, for example by deflecting the micromirror through changing the electrostatic force applied to the micromirror.

Currently, varieties of MEMS-based SLMs for use in display systems have been developed. Regardless of the differences, a common basic configuration of the MEMS-based SLMs comprises a hinge and a mirror plate that is attached to the hinge for rotating relative to the substrate by the hinge. And the mechanism of the MEMS-based SLMs for display is based on rotating the mirror plate of individual micromirrors along the hinge at different angles, thus reflecting incident light onto or away from a display target at the different angles. In this regard, mechanical properties of the hinge, the mirror plate and the attachment of the two are critical factors to the overall performance of the micromirrors and the quality of the displayed images.

Therefore, what is needed is a spatial light modulator having micromirrors with robust mechanical properties for use in display systems.

SUMMARY OF THE INVENTION

In view of the foregoing, the present invention discloses a spatial light modulator having an array of micromirrors the mirror devices. The objects and advantages of the present invention will be obvious, and in part appear hereafter and are accomplished by the present invention. Such objects of the invention are achieved in the features of the independent claims attached hereto. Preferred embodiments are characterized in the dependent claims.

In one example of the invention, a method of making a micromirror device is disclosed herein. The method comprises: depositing first and second sacrificial materials on a substrate; forming a reflective mirror plate on one of the two sacrificial materials; forming a deformable hinge and a post on the other sacrificial material, further comprising: depositing an electrically insulating layer; patterning the electrically insulating layer; depositing and patterning an electrically conductive layer; and wherein the electrically insulating layer is patterned such that the electrically conductive layer is electrically connected to the reflective mirror plate; and removing the first and second sacrificial materials so as to free the deflectable mirror plate. In this example, the substrate can be a light transmissive substrate. Alternatively, the substrate can be a standard semiconductor substrate on which integrated circuits can be fabricated.

In another example, a micromirror device is disclosed. The device comprises: a substrate; a post on the substrate; a deformable hinge connected to the post and held by the post on the substrate; a mirror plate attached to the deformable hinge such that the mirror plate is capable of rotating relative to the substrate; and wherein the mirror plate comprises an electrically conductive layer that is electrically connected to an electrically conductive layer of the post via an electrically conductive layer of the hinge, such that an external power source can be connected to the electrically conductive layer of the mirror plate via the electrically conductive layers of the post and deformable hinge.

In yet another example, a method of fabricating a micromirror device is disclosed. The method comprises: depositing first and second sacrificial layers on a substrate; forming a reflective mirror plate on one of the first or second sacrificial layers; forming a deformable hinge on the other sacrificial layer, the hinge forming comprising: forming a hinge that has a first hinge layer that is electrically insulating and a second hinge layer that is electrically conducting, wherein the first hinge layer is disposed between the second hinge layer and the reflective mirror plate; and wherein the first hinge layer is patterned such that at least a portion of the second hinge layer is electrically connected to the reflective mirror plate; and removing the first and second sacrificial layers so as to free the mirror plate.

In yet another example, a micromirror device is disclosed. The device comprises: a substrate; a post on the substrate, the post comprising an electrically conductive post layer; a deformable hinge held by the post on the substrate, the hinge comprising an electrically conductive hinge layer and an electrically insulating layer, wherein the electrically conductive hinge layer is electrically connected to the electrically conductive post layer of the post; and a reflective and deflectable mirror plate attached to the deformable hinge such that the mirror plate is capable of rotating relative the substrate, said mirror plate comprising an electrically conductive mirror plate layer that is electrically connected to the electrically conductive hinge layer; and wherein the electrically insulating layer is positioned between the electrically conductive layer and the mirror plate and patterned so as to allow electrical connection between the mirror plate and electrically conductive layer of the hinge.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Processes for micro-fabricating a MEMS device such as a movable micromirror and mirror array are disclosed in U.S. Pat. Nos. 5,835,256 and 6,046,840 both to Huibers, the subject matter of each being incorporated herein by reference. A similar process for forming MEMS movable elements (e.g. mirrors) on a wafer substrate (e.g. a light transmissive substrate or a substrate comprising CMOS or other circuitry) is illustrated in the present application. By "light transmissive", it is meant that the material will be transmissive to light at least in operation of the device (The material could temporarily have a light blocking layer on it to improve the ability to handle the substrate during manufacture, or a partial light blocking layer for decreasing light scatter during use.) Regardless, a portion of the substrate, for visible light applications, is preferably transmissive to visible light during use so that light can pass into the device, be reflected by the mirrors, and pass back out of the device. Of course, not all embodiments will use a light transmissive substrate. By "wafer" it is meant any substrate on which multiple micromirrors or microstructure arrays are to be formed and which allows for being divided into dies, each die having one or more micromirrors thereon. Though not in every situation, often each die is one device or product to be packaged and sold separately. Forming multiple "products" or dies on a larger substrate or wafer allows for lower and faster manufacturing costs as compared to forming each die separately. Of course the wafers can be any size or shape, though it is preferred that the wafers be the conventional round or substantially round wafers (e.g. 4", 6" or 12" in diameter) so as to allow for manufacture in a standard foundry.

U.S. patent application Ser. No. 09/910,537 filed Jul. 20, 2001, and 60/300,533 filed Jun. 22, 2001 both to Reid contain examples of materials that may be used for the various components of the current invention. These applications are incorporated herein by reference.

Figure 1A:
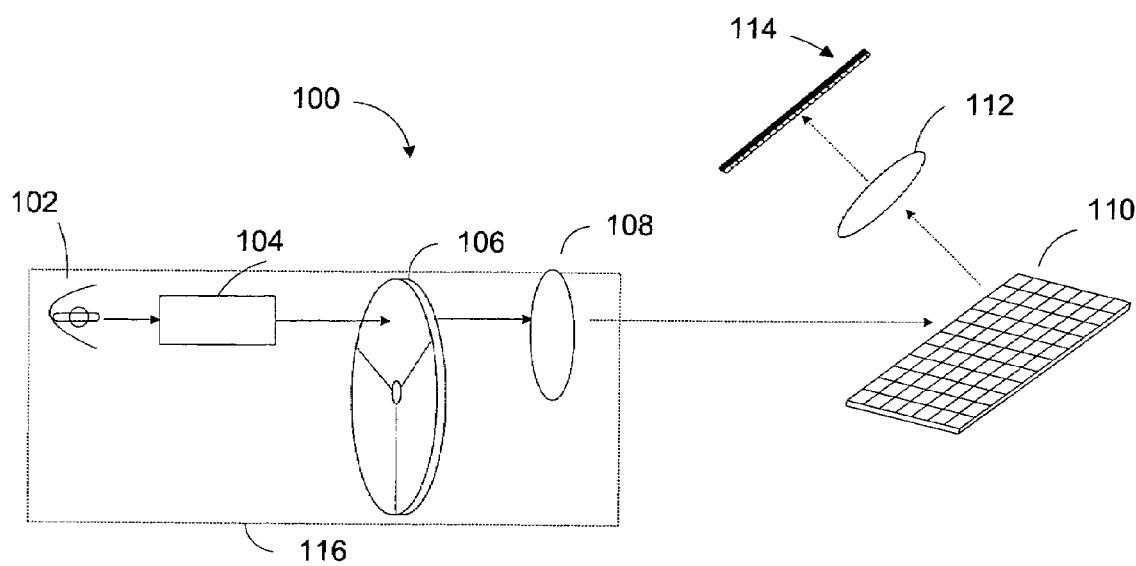
FIG. 1A is a diagram illustrating an exemplary display system employing a spatial light modulator.

Turning to the drawings, FIG. 1A schematically illustrates an exemplary display system that employs a spatial light modulator in which embodiment of the invention can be implemented. In this particular example, display system 100 comprises light source illumination system 116, group lens 108, spatial light modulator 110, projection lens 112, and display target 114. The illumination system may further comprise light source 102, light pipe 104, and color filter 106 such as a color wheel. Alternative to the illumination system 116 as shown in the figure wherein the color wheel is positioned after the light pipe along the propagation path of the illumination light from the light source, the color wheel can also be positioned between the light source and light pipe at the propagation path of the illumination light. The illumination light can be polarized or non-polarized. When polarized illumination light is used, display target 114 may comprise a polarization filter associated with the polarized illumination light, as set forth in U.S. provisional patent application Ser. No. 60/577,422 filed Jun. 4, 2004, the subject matter being incorporated herein by reference.

The lightpipe (104) can be a standard lightpipe that are widely used in digital display systems for delivering homogenized light from the light source to spatial light modulators. Alternatively, the lightpipe can be the one with movable reflective surfaces, as set forth in U.S. patent provisional application Ser. No. 60/620,395 filed Oct. 19, 2004, the subject matter being incorporated herein by reference.

The color wheel (106) comprises a set of color and/or white segments, such as red, green, blue, or yellow, cyan, and magenta. The color wheel may further comprise a clear or non-clear segment, such as a high throughput or white segment for achieving particular purposes, as set forth in U.S. patent application Ser. No. 10/899,637, and Ser. No. 10/899,635 both filed Jul. 26, 2004, the subject matter of each being incorporated herein by reference, which will not be discussed in detail herein.

Figure 1B:
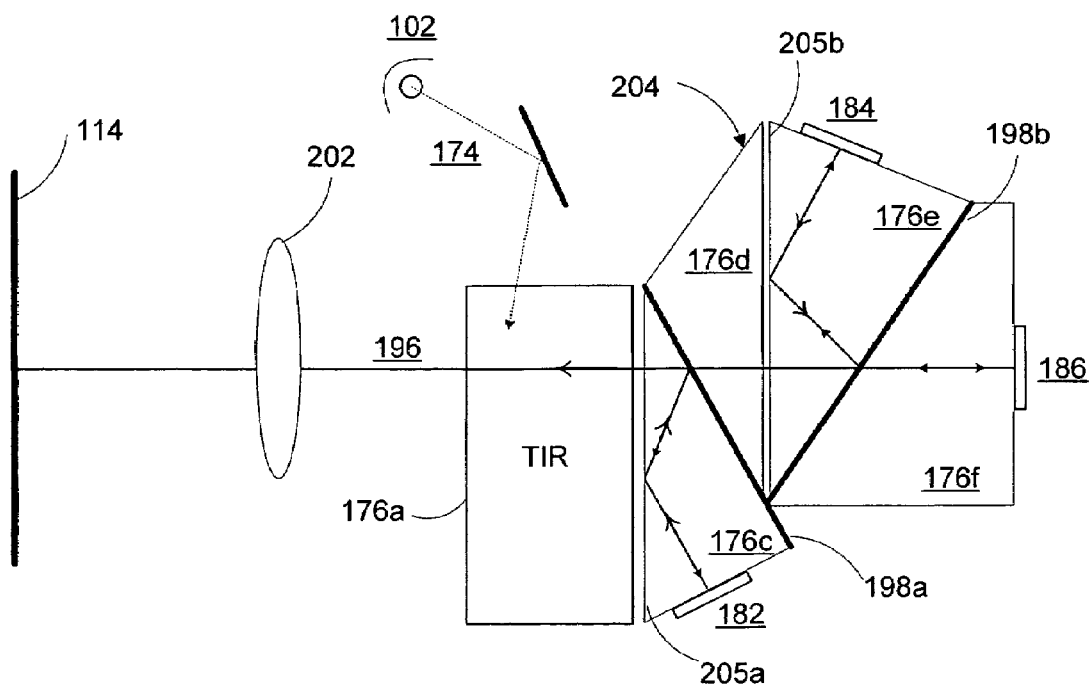
FIG. 1B is diagram illustrating another exemplary display system employing a spatial light modulator.

The display system in FIG. 1A employs one spatial light modulator. However, a display system may use multiple spatial light modulators for modulating the illumination light of different colors. One of such display systems is schematically illustrated in FIG. 1B. Referring to FIG. 1B, the display system uses a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

The light source, such as light source 102 in FIG. 1A and FIG. 1B, of the display system can be any suitable light source, such as an arc lamp, preferably an arc lamp with a short arc for providing intensive illumination light. The light source can also be an arc lamp with a spiral or other reflector, such as set forth in U.S. patent application Ser. No. 11/055,654 filed Feb. 9, 2005, the subject matter being incorporated herein by reference.

Alternatively, the light source can be one or more light-emitting-diodes (LEDs), preferably LEDs of high intensities, due to their compact sizes, low costs, and capabilities of emitting different colors including white. The display system may employ one LED as the light source, in which instance, a LED emitting white color can be used. Alternatively, the display system may use different LEDs for generating red, green, and blue colors for illuminating the spatial light modulator. As an example, gallium nitride light emitting diodes could be used for the green and blue arrays and gallium arsenide (aluminum gallium arsenide) could be used for the red light emitting diode array. LEDs such as available or disclosed by Nichia TM or Lumileds TM could be used, or any other suitable light emitting diodes. When LEDs emitting different colors are used as the light source, the color wheel (e.g. color wheel 106 in FIG. 1A) may be omitted.

In yet another example, an array of LEDs emitting the same (or similar) color can be used for generating a color light for illuminating the spatial light modulator. For example, an array of LEDs emitting white color can be used as the light source for providing intensive illumination light. In some instances, the LEDs can be used along with an arc lamp as the light source for the system. Also, separate groups of LEDs (e.g. red, green and blue) can be provided, or a mixed array of different color LEDs (e.g. red, green and blue) could also be used.

Figure 2:
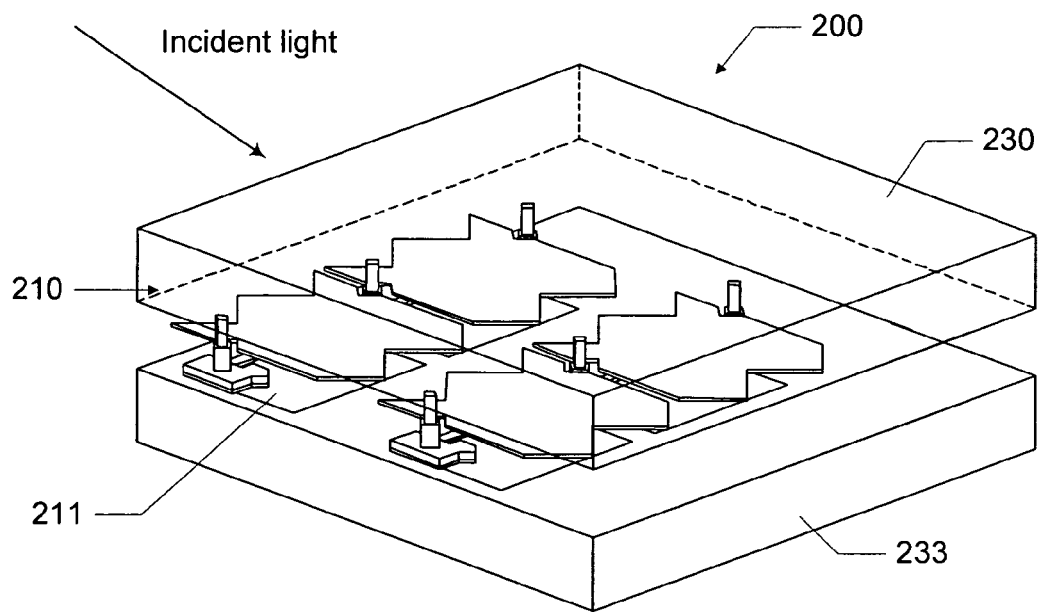
FIG. 2 shows a portion of the spatial light modulator used in the display system of FIG. 1A and FIG. 1B and a portion of an array of micromirrors comprised in the spatial light modulator.

As a way of example, a spatial light modulator usable in display systems in FIG. 1A and FIG. 1B is schematically illustrated in FIG. 2. For simplicity purposes, only 4 (four) are illustrated. In general, the spatial light modulator comprises an array of thousands or millions of micromirrors, the total number of which determines the resolution of the displayed images. For example, the micromirror array of the spatial light modulator may have 1024×768, 1280×720, 1400×1050, 1600×1200, 1920×1080, or even larger number of micromirrors. In other applications, the micromirror array may have less number of micromirrors.

Referring to FIG. 2, an array of micromirrors 210 is formed on a substrate 200, such as glass that is visible light transmissive. Substrate 233, which comprises an array of addressing electrodes (e.g. addressing electrode 211) and circuitry (not shown), is placed proximate to the array of micromirrors for electrostatically deflecting the mirror plates.

In operation, the illumination light passes through the light transmissive substrate and illuminates the reflective surfaces of the mirror plates, from which the illumination light is modulated. The illumination light incident onto the areas corresponding to the surfaces of the posts are blocked (e.g. reflected or absorbed depending upon the materials of the light blocking pads) by the light blocking pads. The reflected illumination light from the mirror plates at the ON state is collected by the projection lens (e.g. projection lens 112 in FIG. 1A) so as to generate a "bright" pixel in the display target (e.g. display target 114 in FIG. 1A). The reflected illumination from the mirror plates at the OFF state travels away from the projection lens, resulting in the corresponding pixels imagined at the display target to be "dark."

Figure 3:
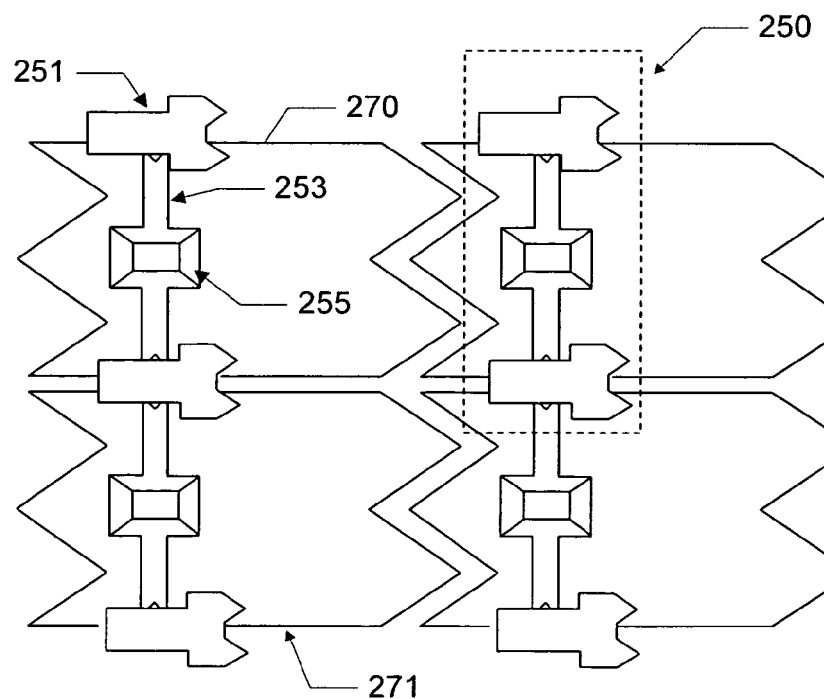
FIG. 3 is a back-view of a portion of the micromirror array of FIG. 2

Referring to FIG. 3, a back-view of the micromirror array shown in FIG. 2 is illustrated therein. As shown, each mirror plate, such as mirror plate 270, is attached to a deformable hinge of a hinge structure (e.g. hinge structure 250) such that the mirror plate can rotate relative to the substrate. To avoid unwanted light scattering from the hinge structure and deformable hinge, the hinge structure is preferably formed under the micromirrors in the direction of the incident light. Specifically, the hinge structure and the surface for reflecting the incident light are on the opposite sides of the mirror plate. As also shown in FIG. 3, each hinge structure further comprises two posts, such as posts 251, hinge 253 and contact area 255. By "hinge" is meant the layer or stack of layers that defines that portion of the device that flexes to allow movement of the device (described in detail below). Though it is preferred that the posts and the contact area are formed in-line, this is not an absolute requirement. Instead, any suitable geometric configurations may also be used. In another embodiment, a micromirror may comprise only one post. In an array of micromirror devices wherein the micromirrors are interconnected, one or more of the micromirror devices in the array may not have a post. In this instance, the mirror plates of the micromirrors having no posts are supported by the hinges and posts of other micromirror devices.

Figure 4:
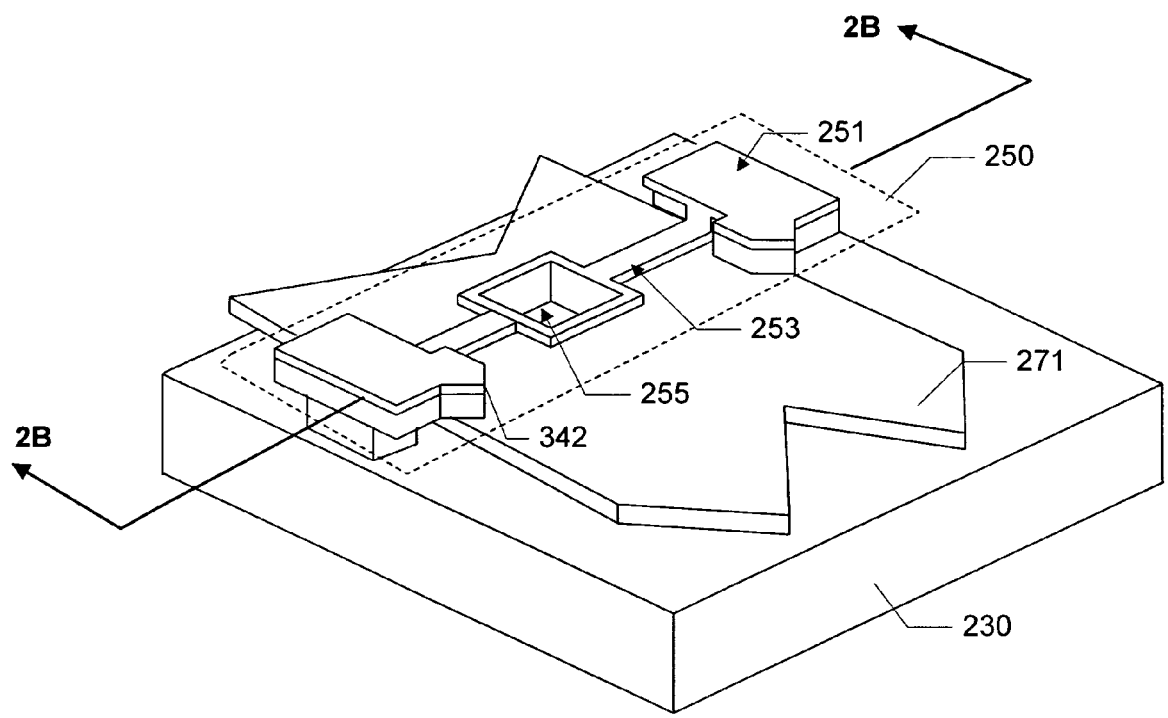
FIG. 4 demonstrates an exemplary micromirror device of the micromirror array of FIG. 3.

Referring to FIG. 4, a perspective view of the micromirror in FIG. 2 and FIG. 3 is schematically illustrated therein. As shown, hinge structure 250 is formed on substrate 230. In this configuration, hinge structure 250 comprises posts 251, hinge 253 and contact 255. Mirror plate 271 is attached to the hinge and the contact such that it can rotate relative to the substrate. The contact is preferably providing an electric contact with the micromirror such that the micromirror can be held at a particular voltage or electrically connected to the ground. Thereby, the rotation of the micromirror can be controlled by the applied electric field.

In operation, the mirror plate rotates relative to the substrate and reflects the incident light in response to an electrostatic field. Such electrostatic field may be between the mirror plate and associated addressing electrode or between the mirror plate and another electrode other than the addressing electrode for deflecting the mirror plate in a direction opposite to that driven by the addressing electrode. According to the invention, the mirror plate comprises a material having high reflectivity to the light of interest, for example, a material of an early transition metal, metal or metal alloy. By "conductor", it is meant that a material whose resistivity is equal to or lower than 100,000 μΩcm, such as Al, Ti, $TiN_x$ or $TiSi_xN_y$. And by "insulator", it is meant that a material whose resistivity is higher than $10^{12}$ μΩcm. In addition, it is desired that the material of the mirror plate also exhibits robust mechanical properties (e.g. low creep rate, high strength, and high elastic modulus etc.) for enhancing the mechanical property of the micromirror. Furthermore, it is desired that the material of the mirror plate is electric conductor such that electric field can be applied thereon.

The hinge structure is provided for supporting the rotation of the mirror plate relative to the substrate. Because the hinge structure may scatter incident light and the scattered light can be mingled with the reflected light, the contrast ratio may be degraded. In order to suppress this type of scattering, the hinge structure is preferably "hidden" beneath the mirror plate. For example, the hinge structure can be formed on a side that is opposite to the side of the mirror plate for reflecting incident light. In accordance with the operation mechanism of the micromirror device and the constructional design, it is desired that the posts comprise materials that are insusceptible to plastic deformation (e.g. fatigue, creep or dislocation motion). It is preferred that such materials have large elastic modulus and exhibit high strength. Opposite to that of the posts, the materials of the hinge (e.g. hinge 253) are expected elastically deform because the hinge deforms while the micromirror rotates. Moreover, the hinge is desired to be electrically conducting such that the hinge can effectively transmit external electric signals to the mirror plate, thereby, set up an electric field between the mirror plate and the associated one or more electrodes for rotating the mirror plate.

There are varieties of ways to construct the micromirror devices described above. Exemplary processes will be discussed in the following with references to FIG. 5A through FIG. 6. It should be appreciated by those ordinary skills in the art that the exemplary processes are for demonstration only and should not be interpreted as limitations.

Figure 5A:
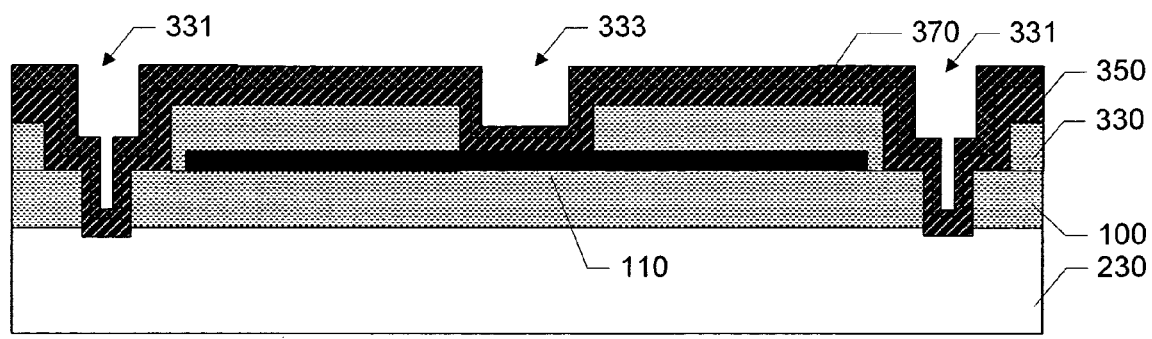
FIG. 5A is a cross-sectional view of the micromirror device of FIG. 4 before patterning the hinge structure layers during an exemplary fabrication process.

Referring FIG. 5A, substrate 230 is provided. First sacrificial layer 100 is deposited on the substrate followed by a deposition of mirror plate layer 110. The substrate is preferably a light transmissive substrate, such as glass (e.g. 1737F, Eagle 2000, Pyrex™), quartz, and sapphire. The substrate may also be a semiconductor substrate (e.g. silicon substrate) with one or more actuation electrodes and/or control circuitry (e.g. CMOS type DRAM) formed thereon.

First sacrificial layer 100 may be any suitable materials, such as amorphous silicon, polymer, and polyimide, and polysilicon, silicon nitride, silicon dioxide depending upon the structural materials of the micromirror selected to be resistant to the etchant, and the etchant selected. If the first sacrificial layer is amorphous silicon, it can be deposited at 300-350° C. The thickness of the first sacrificial layer can be wide ranging depending upon the micromirror size and desired titled angle of the micromirror, though a thickness of from 500 Å to 50,000 Å, preferably around 3,500 Å, is preferred. The first sacrificial layer may be deposited on the substrate using any suitable method, such as LPCVD or PECVD.

After depositing the first sacrificial layer, a plurality of structure layers will be deposited and patterned as appropriated. According to the invention, a structural layer is a layer that will not be removed after the removal of the sacrificial layers. The first structural layer deposited on the first sacrificial layer is mirror plate layer 110 for forming a reflective mirror plate. Because the mirror plate is designated for reflecting incident light in the spectrum of interest (e.g. visible light spectrum), it is preferred that the mirror plate layer comprises of one or more materials that exhibit high reflectivity (preferably 90% or higher, such as 99% or higher) to the incident light. Examples of such materials are Al, Ti, Au, Ag, $AlSi_xCu_y$, $AlTi_x$, or $AlSi_x$. Of course, other suitable materials having high reflectivity to the incident light of interest may also be adopted for the mirror plate. In depositing the mirror plate layer, PVD is preferably used. The thickness of the mirror plate layer can be wide ranging depending upon many factors, such as desired mechanical (e.g. stiffness and strength) and electronic (e.g. conductivity) properties, the size, desired rotation angle of the mirror plate and the properties of the materials selected for the mirror plate. According to the invention, a thickness of from 500 Å to 50,000 Å, preferably around 2500 Å, is preferred. If the mirror plate layer comprises aluminum, it is preferred to be deposited at 150° C. to 300° C. or other temperatures preferably less than 400° C.

In addition to the reflective layer, the mirror plate may also comprise a mechanical enhancing layer, such as a $TiN_x$ layer, for improving the mechanical properties of the mirror plate.

The mirror plate may comprise other suitable functional layers. For example, a barrier layer can be provided for the mirror plate to prevent potential diffusion between the mirror plate layer(s) and the sacrificial material, especially when the mirror plate comprises an aluminum layer and amorphous silicon is used as the sacrificial material. Such barrier layer can be $SiO$ or other suitable materials.

When the metallic reflective layer of the mirror plate is deposited, the metallic reflective layer may form hillocks. This problem can be solved by depositing another protective layer, such as a Ti layer on the metallic reflective layer.

When the mirror plate comprises multiple layers of different mechanical and thermal properties, such as different coefficients of thermal-expansion (CTE), the mirror plate may be curved after removal of the sacrificial materials. Such curvature may or may not be desired. When such curvature is not desired, one or more balance layers can be provided, such as formed on the opposite surfaces of the mirror plate.

In accordance with an embodiment of the invention, the mirror plate comprises an electrically conductive layer on which electrical voltages can be applied, and an electrically insulating layer for enhancing a property (e.g. the mechanical property) of the mirror plate.

Mirror plate layer 110 is then patterned into a desired shape, an example of which is illustrated in FIG. 4. Though preferred, it would be appreciated by those ordinary skilled in the arts that this particular example of micromirror shape is a selection from a variety of optional choices of mirror shapes and is for demonstration purpose only. It should not be interpreted as a limitation. Instead, the mirror plate can be of any desired shape. The patterning of the mirror plate can be achieved using the standard photoresist patterning followed by etching using, for example $CF_4$, $Cl_2$, or other suitable etchant depending upon the specific material of the mirror plate.

After forming the mirror plate, second sacrificial layer 330 is deposited and patterned according to the desired configuration of the hinge structure. Second sacrificial layer 330 may comprise amorphous silicon, or could alternatively comprise one or more of the various materials mentioned above in reference to first sacrificial layer 100. First and second sacrificial layers need not be the same, though are the same in the preferred embodiment such that the etching process for removing these sacrificial layers can be greatly simplified. Similar to the first sacrificial layer, second sacrificial layer 330 may be deposited using any suitable method, such as LPCVD or PECVD. If the second sacrificial layer comprises amorphous silicon, the layer can be deposited around 350° C. The thickness of the second sacrificial layer can be on the order of 9000 Å, but may be adjusted to any reasonable thickness, such as between 2000 Å and 20,000 Å depending upon the desired distance (in the direction perpendicular to the mirror plate and the substrate) between the mirror plate and the hinge. Second sacrificial layer 330 may also fill in the trenches left from the patterning of the mirror plate.

The deposited second sacrificial layer is patterned afterwards for forming two deep-via areas 331 and shallow via area 333 using standard lithography technique followed by etching. The etching step may be performed using $Cl_2$, $BCl_3$, or other suitable etchant depending upon the specific material(s) of the second sacrificial layer. The distance across the two deep-via areas 331 depends upon the side-to-side distance of the mirror plate. In an embodiment of the invention, the distance across the two deep-via areas after the patterning is preferably around 10 µm, but can be any suitable distance as desired. In order to form shallow-via area 333, an etching step using $CF_4$ or other suitable etchant may be executed. The shallow-via area, which can be of any suitable size, is preferably on the order of 2.2 μm.

In order to form the desired deep-via area 331 profiles as shown, a via-mask and partial sacrificial layer etching are applied. According to an embodiment of the invention, the wider region of each deep-via area 331 is on the order of 1.0 to 2.0 um, preferably 1.4 um, and the smaller region is on the order of 0.5 to 1.5 um, preferably 1.0 um. Of course, other dimensions are possible depending upon the final size and shape of the mirror plate. As an optional feature, the deep-via areas may reach through first sacrificial layer 100 and may reach from 500 Å to 2000 Å into substrate 230. As discussed above, the deep-via areas are formed in two etching steps. By doing so, the effect of resist erosion may be reduced, and step coverage of $SiN_x$ in the subsequent deep-via fill deposition may be improved. However, a single etching step can also be used.

After patterning the second sacrificial layer, hinge structure layers 350 and 370 are deposited on the patterned second sacrificial layer 330. During the deposition, layers 350 and 370 fill the formed deep-via areas 331 and shallow-via area 333. Because the hinge structure layers also form the posts (e.g. 251 in FIG. 4) for holding the hinge (e.g. 253 in FIG. 4) and the mirror plate (e.g. 270 in FIG. 4) attached thereto such that the mirror plate can rotate relative to the substrate by the hinge, it is desired that the hinge structure layers (e.g. 350 and 370) comprise materials having a sufficiently large elastic modulus.

According to the invention, the hinge structures layers, and thus the posts, comprise an electrically conductive material and electrically insulating material. The electrically conductive material transmits electrical signals, such as electrical voltages from external source to the mirror plate. The electrically insulating material improves a property, such as the mechanical property of the post and the hinge structure.

According to an embodiment of the invention, layer 350 comprises a 300 Å thickness of $TiN_x$ layer deposited by PVD, and layer 370 comprises a 3500 Å thickness of $SiN_x$ layer deposited by PECVD. Of course, other suitable methods of deposition may be used, such as LPCVD or sputtering. Alternatively, layer 350 can be a Ti layer with a preferred thickness of 200 Å. Layer 350 is not necessary for the invention, but provides a conductive contact surface between the micromirror and the hinge structure in order to, at least, reduce charge-induced stiction. It is preferable to deposit the $TiN_x$ and $SiN_x$ layers such that the intrinsic stress is as low as possible, preferably lower than 250 MPa. The $SiN_x$ layer can be deposited at 400° C. Of course, other suitable materials, such as $CoSiN_x$, $TiSiN_x$ and/or $TiO_x$ may also be used for the hinge structure. As an optional feature of the invention, layer 350 is not deposited and only layer 370 is deposited for the hinge structure. In this case, layer 370 is $SiN_x$ with a thickness of 1000 Å to 10,000 Å, preferably 4000 Å.

Figure 5B:
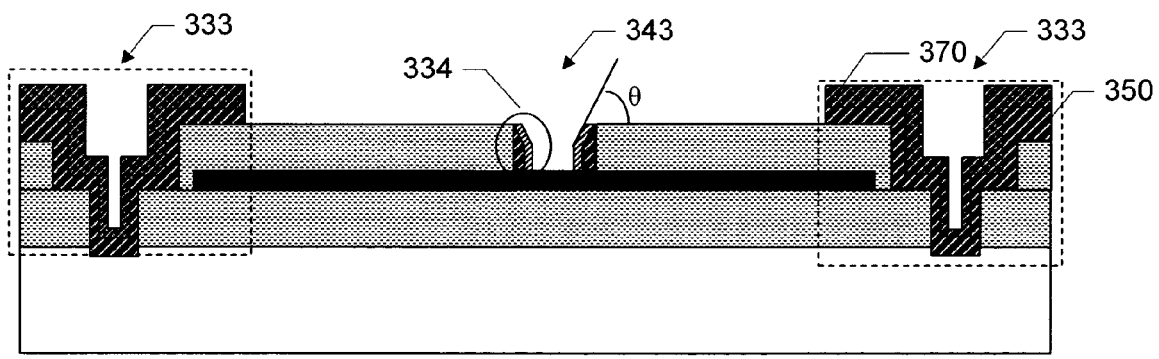
FIG. 5B is a cross-sectional view of FIG. 5A after patterning the hinge structure layers.

After the deposition, layers 350 and 370 are then patterned for forming the two posts 333 and contact 343 by etching using one or more proper etchants, as shown in FIG. 5B. In particular, the layers can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g.

chlorine chemistry for a metal layer, hydrocarbon or fluorocarbon (or $SF_6$) plasma for silicon or silicon compound layers, etc.).

Alternatively, the etching step can be performed after deposition of each hinge structural layer. For example, layer 350 can be etched and patterned after the deposition of layer 350 and before the deposition of layer 370. This may be important when the post layers (hinge structure layers) comprise an electrically insulating layer and an electrically conductive layer; and an electrical contact between the post and deformable hinge is to be formed. In this instance, the insulating layer and conductive layer may be patterned into different shapes. Specifically, the insulating layer may be patterned to have a contact area through which the electrically conductive layer of the post is electrically connected to the deformable hinge that is to be formed in the following.

After etching, two posts 333 and contact 343 are formed. According to the embodiment of the invention, each of the two posts 333 is formed with a tip 342 (as shown in FIG. 4) for limiting the rotation of the mirror plate in operation. The physical configuration (e.g. position and length) of the tip, along with the distance between the mirror plate and the substrate, determines the maximum rotation angle of the mirror plate, wherein the maximum rotation angle can be used to define the "ON" state of the micromirror device. In this situation, a uniform configuration of the tips of all individual micromirror devices ensures a uniform "ON" state for all micromirror devices. This certainly improves the performance of the micromirror devices, thus improves the quality of displayed images.

The bottom segment of contact 343 is removed by etching and a part of the mirror plate is thus exposed. The exposed part of the mirror plate will be used to form an electrical contact with the hinge. The sidewalls of contact 343 are left with residues of layers 350 and 370 after etching. The residue 334 has a slope measured by angle θ approximately 75 degrees, but may vary between 0 and 89 degrees.

Figure 5C:
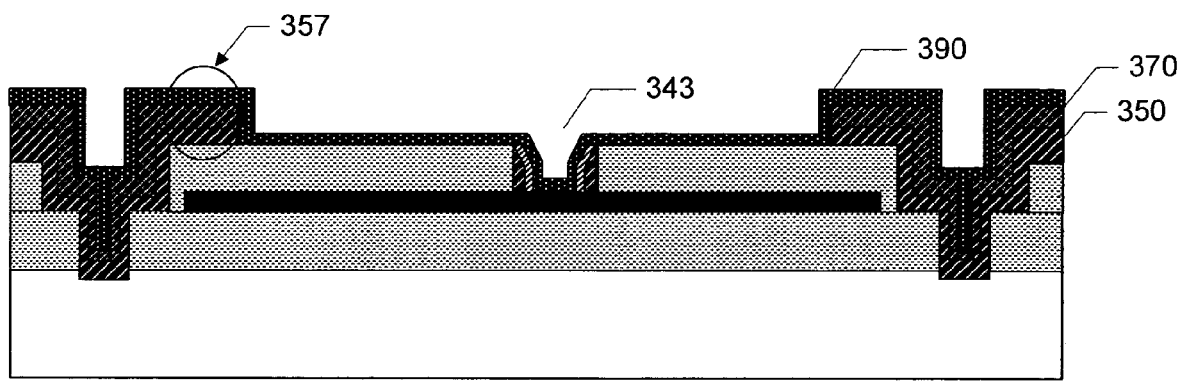
FIG. 5C is a cross-sectional view of FIG. 5B after depositing a and patterning hinge layers.

After patterning layers 350 and 370, hinge layer 390 is deposited and then patterned as shown in FIG. 5C. Because the hinge deforms with the mirror plate rotating, it is expected that the hinge is more susceptible to plastic deformation (e.g. fatigue, creep, or dislocation motion). Furthermore, when the hinge is also used as electric conducting media for the mirror plate, it is further expected that the hinge is electrically conductive.

Figure 5D:
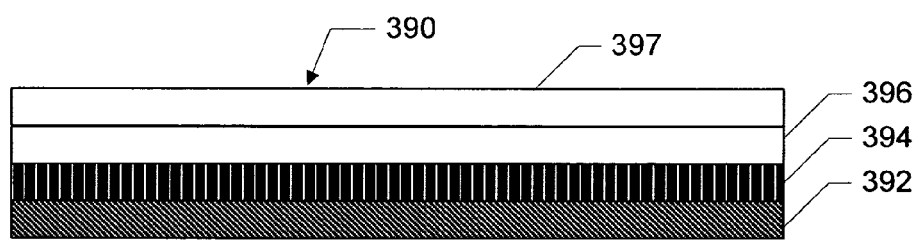
FIG. 5D is a cross-sectional view of a multiplayer hinge structure according to an embodiment of the invention.

According to an embodiment of the invention, hinge 390 is a multilayered structure, as shown in FIG. 5D. Referring to FIG. 5D, hinge 390 further comprises layers 392, 394 and 396. The outside layers 392 and 396 are electric conductors, such as an elemental metal substance, metalloid, inter-metallic compounds, conductive ceramics and metal alloys. And the intermediate layer is electric insulator, such as a ceramic. For example, the outside layers 392 and 396 comprise $TiN_x$, aluminum, titanium, Ir, titanium oxide(s), titanium carbide, $CoSi_xN_y$, $TiSi_xN_y$, $TaSi_xN_y$, $CoSi_xO_y$ or other ternary compositions such as set forth in U.S. patent application Ser. No. 09/910,537 to Reid filed Jul. 20, 2001 and Ser. No. 10/198,389 to Reid, filed Jul. 16, 2002, each incorporated herein by reference. In the preferred embodiment of the invention, the outside layers are $TiN_x$. The intermediate layer 394 can be any suitable ceramic, such as $SiN_x$, $SiO_x$, silicon carbide, or polysilicon. Therefore, a $TiN_x$—$SiN_x$—$TiN_x$ triple layer structure is preferably formed for the hinge. Alternatively W—$SiN_x$($SiO_y$)—W, Al—$SiN_x$($SiO_y$)—Al, Ti—$SiN_x$($SiO_y$)—Ti or Ti(Al)—$SiN_x$($SiO_y$)—Al(Ti) triple layer structure can also be formed for the hinge structure.

The thicknesses of the hinge layers can be adjusted depending on the materials selected and the desired mechanical and electric properties of the hinge, the stiffness of the movable element, the desired flexibility of the hinge, or other relevant factors. For example, for a Ti—SiN$_x$—Ti hinge stack, layer thicknesses on the order of 100-600-100 Å. For another example, for an Al—SiO$_x$—Ti triple structure, layer 392 is aluminum with a preferred thickness of 2500 Å for providing an efficient electric contact with the mirror plate, and with layer 396 being titanium with a preferred thickness of 80 Å. The intermediate layer 394 is a ceramic insulating layer, such as SiO$_2$ with a thickness of 400 Å, for properly insulting layers 392 from 396. Furthermore, the ceramic insulting layer 394 may also enhance mechanical properties, such as creep resistance and/or resistance to plastic deformation, of the hinge. Of course, these layer thicknesses can vary widely depending on any of the above factors. The layer thicknesses can also be adjusted to affect the overall intrinsic stress of the hinge. For example, if each of the outside layers 392 and 396 exhibits an intrinsic stress of −100 MPa (compressive) and intermediate layer 394 exhibits an intrinsic stress of +150 MPa (tensile), the thickness of the intermediate layer can be increased to ensure that the average intrinsic stress is tensile. If the intermediate layer thickness is increased to three times that of the outside layers, the average intrinsic stress is given by [(−100)*2+(150)*3]/(2+3), or +50 MPa (tensile).

According to another embodiment of the invention, layer 392 is an electrically conducting layer that comprises a material having a resistivity less than 100,000 μΩ·cm. The intermediate layer 394 is an insulator with a resistivity greater than 10$^{12}$ μΩ·cm. And layer 396 is an electrically conducting layer with a resistivity also less than 100,000 μΩ·cm.

According to yet another embodiment of the invention, layer 396 has a resistance to a gas-phase etchant higher than that of the intermediate layer 394. And layer 392 has a higher resistance than the intermediate layer 394 to the gas-phase etchant.

According to another embodiment of the invention, layers 396 and 392 are ceramic layers for enhancing the mechanical properties of the hinge. Exemplary materials for the outside layers 396 and 392 are silicon nitride(s), silicon oxide(s), silicon carbide(s), or polysilicon. And the intermediate layer 394 comprises electric conductors, such as single metal substance, metalloid, inter-metallic compounds, conductive ceramics and metal alloys. Exemplary materials for the intermediate layer 394 are TiN$_x$, aluminum, titanium, Ir, titanium oxide(s), titanium carbide, CoSi$_x$N$_y$, TiSi$_x$N$_y$, TaSi$_x$N$_y$, CoSi$_x$O$_y$ or other ternary compositions such as set forth in U.S. patent application Ser. No. 09/910,537 to Reid filed Jul. 20, 2001 and Ser. No. 10/198,389 to Reid, filed Jul. 16, 2002. For example, a SiN$_x$(SiO$_y$)—TiN$_x$(Ti, Al, W, CoSi$_x$O$_y$ or CoSi$_x$N$_y$)—SiN$_x$(SiO$_y$) triple layer structure can be formed for the hinge. In this configuration, layer 392 comprises a ceramic material. Layer 396 is a ceramic layer, which can be the same as layer 392. And the intermediate layer 394 is an electric-conducting layer functioning as an electric conducting media such that an electric field can be set up between the mirror plate and one or more electrodes. In this case, the intermediate layer 394 functions as an electric conducting media. In order to contact layer 394 with the mirror plate at contact area 343, the first deposited ceramic layer 392 will be patterned and etched before depositing the electric conducting layer 394 such that the segment of the ceramic layer 392 at the contact area 343 will be removed. Therefore, the conducting layer 394 can make an electric contact with the mirror plate at contact area 343 after being deposited.

In yet another embodiment of the invention, the intermediate layer 394 provides an electric contact with the mirror plate. Ideal materials for this layer are expected to be "good" conductors (e.g. with high electric conductivity). In addition, it is expected that the materials of this layer exhibits proper mechanical properties, such as high strength and large elastic modulus. A typical candidate material is titanium. Other suitable materials, such as Cu and silver can also be used for layer 394. However, these materials, especially titanium, exhibit low resistances to oxidization. When used alone for the hinge, titanium hinge is oxidized, and desired mechanical and electrical properties would not be guaranteed. In order to diminish the oxidization of layer 394, the bottom layer 392 and the top layer 396 are deposited for passivating the oxidization of the intermediate layer 394. Layers 392 and 396 may comprise materials with high resistances to oxidation. Exemplary materials for these two layers are aluminum, SiN$_x$, SiO$_x$, Cr, TiN$_x$ and Au. Alternatively, an additional layer (not shown) can be deposited on the intermediate layer 394 before depositing the top layer 396. The additional layer can be deposited for enhancing the mechanical property of the hinge. Specifically, the additional layer can be SiN$_x$. In this regards, a tetra-layered structured, such as TiN$_x$—Ti—SiN$_x$—TiN$_x$ is formed for the hinge.

The multilayered structure as shown in FIG. 5D comprises three layers. It will be appreciated by those of ordinary skill in the art that the number of layers of the multilayered structure in FIG. 5D should not be interpreted as a limitation. Instead, any number of layers can be employed without depart from the spirit of the present invention.

In the embodiments described above, the hinge is a multi-layered structure. However, the hinge can be a single electric conducting layer, such as single metals, metal compounds or metal alloys. Examples of suitable materials for the hinge layer are silicon nitride, silicon carbide, polysilicon, Al, Ir, titanium, titanium nitride, titanium oxide(s), titanium carbide, CoSi$_x$N$_y$, TiSi$_x$N$_y$, TaSi$_x$N$_y$, or other ternary and higher compounds. When titanium is selected for the hinge layer, it can be deposited at 100° C. to 400° C.

After deposition, the hinge layers are then patterned and etched. Similar to the hinge structure layers (layers 350 and 390), the hinge layers can be etched with a chlorine chemistry or a fluorine chemistry where the etchant is a perfluorocarbon or hydrofluorocarbon (or SF$_6$) that is energized so as to selectively etch the hinge layers both chemically and physically (e.g. a plasma/RIE etch with CF$_4$, CHF$_3$, C$_3$F$_8$, CH$_2$F$_2$, C$_2$F$_6$, SF$_6$, etc. or more likely combinations of the above or with additional gases, such as CF$_4$/H$_2$, SF$_6$/Cl$_2$, or gases using more than one etching species such as CF$_2$Cl$_2$, all possibly with one or more optional inert diluents). Different etchants may, of course, be employed for etching each hinge layer (e.g. chlorine chemistry for a metal layer, hydrocarbon or fluorocarbon (or SF$_6$) plasma for silicon or silicon compound layers, etc.). Alternatively, the hinge layers 392, 394 and 396 can be patterned and etched consecutively after depositions.

Figure 6:
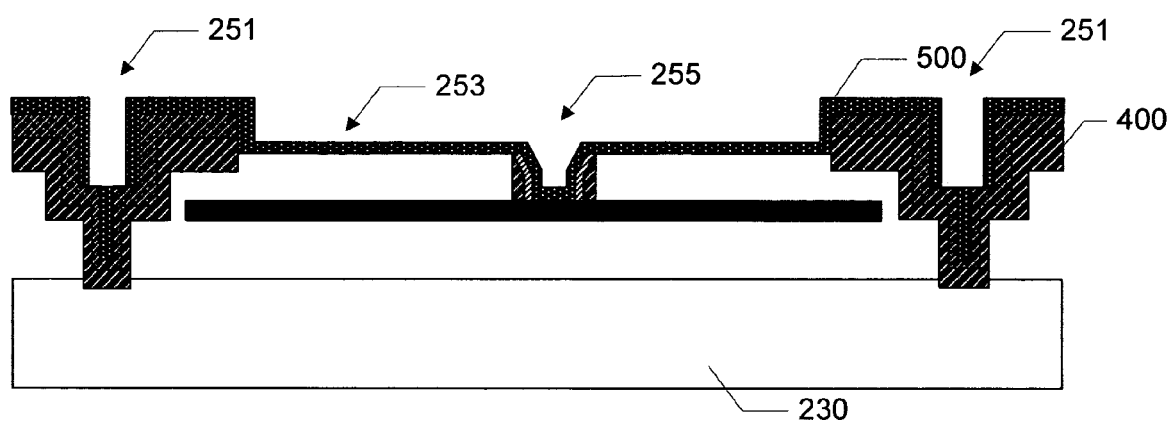
FIG. 6 is the cross-sectional view of FIG. 5D after removing the first and second sacrificial layers.

Finally, the first and second sacrificial layers 100 and 330 are removed using etching so as to release mirror plate 110. FIG. 6 shows a cross-sectional view of the micromirror device after releasing. As can be seen in the figure, posts 251 is formed on substrate 230 and hold hinge 253, to which mirror plate 110 is attached. The mirror plate is capable of rotating relative to the substrate by the hinge.

The release etch utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are spontaneous chemical vapor phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluent (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SeCO_2$, or supercritical $CO_2$ (the use of supercritical $CO_2$ as an etchant is described in U.S. patent application Ser. No. 10/167,272). Of course, the use of any of these etchants/methods requires that the material(s) to be etched are not resistant to the particular etchant used.

During the chemical etching for removing the sacrificial materials, structural layers, such as the hinge layers, may also be eroded by the chemical etchant. For example, the top hinge layer (e.g. layer 396 in FIG. 5D) may be eroded in the chemical etching, such as plasma etching or other fabrication processes. This problem can be solved by depositing a protection layer on the structural layers exposed to etching, such as protection layer 397 in FIG. 5D.

Referring to FIG. 5D, layer 397 is deposited on layer 396 that is exposed to etching. Layer 397 comprises a material that preferably can be removed during the etching process, or a material that is less resistant to the etching process. When the etching process uses different etchants and/or different etching stages, it is preferred that the protection material is more etchable in the etchant (or etching process) that more etches the structural layers of the micromirror device. For example, the etching process may comprise a plasma etching and a spontaneous etching that uses a spontaneous vapor phase etchant as discussed above. The protection layer (layer 397 in FIG. 5) is then preferred to have a protection material that is more resistant to the plasma etching than to the spontaneous vapor phase etching. During the patterning processes for the structural layers, such as the patterning of the hinge and mirror plates, the structural layers and the protection layers may be exposed to the etching. In this instance, the protection layer is desired to be less resistant to the etching during the patterning. At all events, the protection material is desired to be removed after removal of the sacrificial materials.

The protection layer (layer 396) may comprises any suitable materials, such metal elements (e.g. transition metals including early and late transition metals), metal alloys (e.g. early and late transition metal alloys), metal compounds (e.g. early and late transition metal compounds) including early and late transition metal nitrides. An example of the metal element is tungsten. An example of the metal compound is tungsten nitride. Of course, other suitable barrier materials such as amorphous silicon are also applicable.

In accordance with yet another embodiment of the invention, the protection layer may comprise a structural material even such structural material may be etchable during the etching process. For example, protection layer 397 in FIG. 5D may comprise the same material of layer 396 that is exposed to the etching. However, the protection layer is preferably having a thickness such that after the etching, protection layer 396 can be completely removed.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A method of fabricating a micromirror device, comprising:
    depositing first and second sacrificial layers on a substrate;
    forming a reflective mirror plate on one of the first or second sacrificial layers;
    forming a deformable hinge on the other sacrificial layer;
    depositing a protection layer on the formed deformable hinge;
    removing the sacrificial layer and protection layer so as to free the mirror plate.

2. The method of claim 1, wherein the protection layer is more resistant to a first etching than a structural layer of the device; and less resistant to a second etching than the structural layer; and wherein the structural layer is a layer that remains after the sacrificial layer is removed.

3. The method of claim 2, wherein the first etching is an etching process that Patterns a structural layer of the device.

4. The method of claim 2, wherein the second etching is an etching process that thoroughly removes substantially all sacrificial layers.

5. The method of claim 4, wherein the first etching is a breakthrough etching in removing the first and second sacrificial layers.

6. The method of claim 4, wherein the first etching is an etching process that patterns a structural layer of the device.

7. The method of claim 1, wherein the protection layer comprises W.

8. The method of claim 1, wherein the protection layer comprises $WNi_x$.

9. The method of claim 1, wherein the protection layer comprises amorphous silicon.

10. The method of claim 9, wherein the hinge comprises SiNx.

11. The method of claim 9, wherein the hinge comprises TiNx.

12. The method of claim 1, wherein the step of removing the sacrificial and protection layers further comprises:
    removing at least a first portion of the sacrificial materials using a plasma etch, while leaving a second portion of the sacrificial materials; and removing the second portion of the sacrificial materials and protection layer using a spontaneous vapor phase etchant.

13. The method of claim 12, wherein at least a portion of the protection layer remains after the plasma etch.

14. The method of claim 12, wherein the spontaneous vapor phase chemical etchant comprises an interhalogen.

15. The method of claim 14, wherein the spontaneous vapor phase chemical etchant comprises a noble gas halide.

16. The method of claim 15, wherein the noble gas halide is xenon difluoride.

17. The method of claim 15, wherein the etchant comprises a diluent gas.

18. The method of claim 1, wherein the substrate is transmissive to visible light.

19. The method of claim 1, wherein the substrate is a standard semiconductor substrate on which an integrated circuit can be fabricated.

20. The method of claim 1, wherein the first sacrificial layer is deposited on the substrate; wherein the mirror plate is formed on the first sacrificial layer; wherein the second sacrificial layer is deposited and patterned on the first sacrificial layer and the formed mirror plate; and wherein the deformable hinge is formed on the second sacrificial layer.

21. The method of claim 2, wherein the first sacrificial layer is deposited on the substrate that is a semiconductor substrate; wherein the deformable hinge is formed on the first sacrificial layer; wherein the second sacrificial layer is deposited on the first sacrificial layer and the deformable hinge; and wherein the mirror plate is formed on the second sacrificial layer.

22. The method of claim 2, wherein the step of forming the mirror plate further comprises:
depositing first and second mirror plate layers, wherein the first layer comprises a visible light reflective layer; and
wherein the second mirror plate layer comprises a mechanical enhancing layer for improving a mechanical property of the mirror plate.

23. The method of claim 22, wherein the first mirror plate layer is electrically conductive.

24. The method of claim 23, wherein the second mirror plate layer is electrically insulating.

25. A method of fabricating a hinged MEMS device, comprising:
depositing a sacrificial layer on a substrate;
depositing and patterning a flexible hinge structure and a rigid movable member after depositing the sacrificial layer;
depositing a protection layer on the flexible hinge;
removing the sacrificial layer and the protection layer so as to release the MEMS device, wherein the depositing of a sacrificial layer on a substrate comprises depositing a first and second sacrificial layer on the substrate, wherein the depositing and patterning of the hinge and movable member comprise, after depositing the first sacrificial layer, depositing and patterning the movable member, followed by depositing the second sacrificial layer, followed by depositing and patterning the hinge structure.

26. A method of making a MEMS device, comprising:
on an array of movable plates connected to a substrate, depositing a sacrificial layer;
on the sacrificial layer, depositing a hinge layer and patterning the hinge layer into an array of hinges;
on the array of hinges, depositing a protection layer; and
removing the sacrificial layer and the protection layer.

* * * * *